United States Patent
Bolt

(10) Patent No.: US 9,164,909 B1
(45) Date of Patent: Oct. 20, 2015

(54) METHOD FOR THE USE OF PROCESS IDENTIFIERS TO INVALIDATE CACHED DATA IN ENVIRONMENTS THAT ALLOW PROCESSES TO MIGRATE BETWEEN PHYSICAL MACHINES

(71) Applicant: Samsung Electronics Co., Ltd., Suwon-si, Gyeonggi-do (KR)

(72) Inventor: Thomas R. Bolt, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/455,886

(22) Filed: Aug. 9, 2014

Related U.S. Application Data

(63) Continuation of application No. 14/042,540, filed on Sep. 30, 2013, now abandoned, which is a continuation of application No. 13/672,732, filed on Nov. 9, 2012, now abandoned.

(60) Provisional application No. 61/655,530, filed on Jun. 5, 2012.

(51) Int. Cl.
*G06F 12/00* (2006.01)
*G06F 12/08* (2006.01)

(52) U.S. Cl.
CPC ........ *G06F 12/0833* (2013.01); *G06F 12/0808* (2013.01); *G06F 2212/621* (2013.01)

(58) Field of Classification Search
CPC .......................... G06F 12/0808; G06F 12/084
USPC .......................................................... 711/133
See application file for complete search history.

(56) References Cited

U.S. PATENT DOCUMENTS 6,898,791 B1 * 5/2005 Chandy et al. ................ 719/314

* cited by examiner

*Primary Examiner* — Larry Mackall
(74) *Attorney, Agent, or Firm* — Renaissance IP Law Group LLP

(57) ABSTRACT

A method for utilizing process identifiers to invalidate cached data is disclosed herein. The invention is a method for associating persistently stored data with an identifier of the process which created it, such that when the process that created the data is no longer present on the machine where the data is stored the data may be marked as invalid to prevent the use of "stale" data.

10 Claims, 8 Drawing Sheets

METHOD FOR THE USE OF PROCESS IDENTIFIERS TO INVALIDATE CACHED DATA IN ENVIRONMENTS THAT ALLOW PROCESSES TO MIGRATE BETWEEN PHYSICAL MACHINES

CROSS REFERENCE TO RELATED APPLICATION

The Present Application is a continuation application of U.S. patent application Ser. No. 14/042,540, filed on Sep. 30, 2013, which is a continuation application of U.S. patent application Ser. No. 13/672,732, filed on Nov. 9, 2012, which claims priority to U.S. Provisional Patent Application No. 61/655,530, filed on Jun. 5, 2012, all of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to cache resources for computer systems.

2. Description of the Related Art

To minimize access latency and maximize performance, data caches must be located as closely as possible to the processing units that operate on the data. Data centers often deploy "shared" or "networked" mass storage devices to facilitate the movement of processes between separate physical compute servers—examples of this include VMware's ESXi hypervisor with vMotion capability as well as Microsoft's HyperV implementation and several open source virtualization products, cloud computing environments, clustered computing environments, and grid computing environments. The movement of processes between physical servers can be done for any number of reasons including, but not limited to load balancing, disaster preparedness testing, power conservation, and routine maintenance.

When local data caches are used within physical servers, problems arise when processes are allowed to move between physical servers. Depending on circumstances, it may consume considerable resources or be impossible to coordinate the caches of separate physical machines to maintain data consistency; particularly so if the data caching devices are non-volatile and retain their contents when the machines that contain them are powered off. FLASH based cache devices are an example of such a non-volatile cache device.

If a process is executing on a physical machine "A" and causes data to be cached locally on machine "A", then later is migrated to a new process executing on a separate physical machine "B", the following scenario may occur. While executing on machine "B", the process may alter a data object that has been stored in the local cache of machine "A". If the process on machine "B" is migrated back to machine "A" at a later time and accesses the cached copy of the data that had been altered on machine "B", the wrong data will be operated on leading to undesired behavior.

The approach used by competing products has been to logically segregate the cache device and to assign portions of the cache device to individual "guests" or processes within a physical machine. This approach requires administrative overhead in the assignment of caching resources, as well as requiring a mechanism to administratively associate the logical cache segments with individual processes. An example of this would be to logically partition a cache device into multiple logical units (referred to as LUNs), and then to use a LUN identifier (consisting of either a serial number scheme or physical path identification) to assign a LUN to a "guest" or process. When a "guest" or process is migrated from one physical machine to another, the LUN can then be either destroyed, invalidated, or re-assigned to another "guest" or process. Other mechanisms for portioning the cache device may also be used.

Disadvantages of this approach include, but are not limited to the administrative tasks necessary to partition and assign ownership of the cache device, the static nature of the amount of caching resources available to an individual "guest" or process (implementation dependent).

Some competing products do not support the movement of processes from one physical machine to another.

General definitions for terms utilized in the pertinent art are set forth below.

"Cache" refers to the memory in which data is stored in order to make the data more readily and speedily accessible, transparently. When a cache is exhausted, it is flushed of data, to be replaced with the next cache according to a replacement algorithm.

"Cached data" is data in cache memory duplicating original values stored elsewhere (such as the hard disk) on a computer.

"Cache hit" refers to when the processor looks for data in cache memory and finds the data. A cache hit places less strain on input/output (I/O) resources and limited network resources.

"Cache miss" refers to when the processor looks for data in cache memory and finds that it is not there, resulting in having to read from the main memory or hard disk. Data retrieved during a cache miss is often written into the cache in anticipation of further need for it.

"Caching resources" refers to the physical or virtual components of limited availability required for caches or the process of caching, such as memory or a processing unit.

"Cloud computing" is generally defined as using computing resources, primarily servers, owned by a third party provider (such as the AMAZON ELASTIC COMPUTE CLOUD, JOYENT, and GOOGLE APPS) such that the user does not need to make a substantial investment in computer hardware and scale resources depending on the user's needs. Cloud computing primarily involves Web applications but can include storage, raw computing and other specialized services.

"Data center" is a centralized location where computing resources (such as, host computers, servers, applications, databases, or network access) critical to an organization are maintained in a highly controlled physical environment.

"Execution environments" refers to operating systems or virtual machines in which executable programs are executed. When a computer program is executed, or running, a process is created.

"Load balancing" refers to distributing workload across multiple computers, central processing units, or other resources, to achieve optimal resource utilization, maximize throughput, minimize response time, and avoid overload.

"Logical unit number" or "LUN" is an identification number given to logical units (devices) connected to a SCSI "Small Computer System Interface" adapter; typically, the logical disks in a storage area network (SAN).

"Mass storage devices" refers to removable or non-removable media that can store large amounts of data, such as tape drives, redundant array of independent disks (RAID), magnetic disks, or flash drives.

"Non-volatile caching device" refers to a storage device that can retain data within memory even when the device is not powered on, such as a flash drive.

"Open source software" or "OSS" refers to computer software that is available with open access to the source code (design and implementation), which is typically free.

"Process identifier", "process ID", or "PID" is a number used by operating systems (OS) to uniquely identify a process, an OS object that consists of an executable program, a set of virtual memory addresses, and one or more threads. When a program runs, a process is created.

"Virtualization" refers to a computer software/hardware platform that allows running several operating systems simultaneously on the same computer. VMware vSphere Hypervisor™ (ESXi) is an example of a hardware virtualization product.

"Virtualized environment" refers to hypervisor, or virtualization, systems.

"Web-Browser" is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

"Web-Server" is a computer able to simultaneously manage many Internet information-exchange processes at the same time. Normally, server computers are more powerful than client computers, and are administratively and/or geographically centralized. An interactive-form information-collection process generally is controlled from a server computer.

Data center environments often allow processes (such as computer programs) to move from one physical machine to another physical machine for the purposes of load balancing, power conservation, or routine maintenance. This presents a problem for any data that is persistently stored within a physical machine, since the data may be modified on a different machine when a process has been migrated, rendering the original data to be invalid or "stale."

BRIEF SUMMARY OF THE INVENTION

The present invention is a method for associating persistently stored data with an identifier of the process which created it, such that when the process that created the data is no longer present on the machine where the data is stored the data may be marked as invalid to prevent the use of "stale" data.

The purpose of this invention is to provide a mechanism to invalidate locally cached data when a process that accesses the data moves between separate physical machines in a computing environment. This provides two main benefits: first the prevention of accessing "stale" data that may have been modified on a separate machine, and second to allow the timely reclamation of caching resources that have been consumed by processes that are no longer present.

One aspect of the present invention is a method for utilizing process identifiers to invalidate cached data. The method includes assigning a process identifier with a process on the first physical machine of a computing system. The method also includes generating a key value that includes the process identifier and maps a logical address on the first physical machine of the cached data. The method also includes storing cached data associated with the process using the generated key value in the cache entry on the first physical machine. The method also includes migrating the process from a first physical machine of a computing system to a second physical machine of the computing system. The method also includes invalidating the cached data associated with the process identifier based on the termination of the process.

Yet another aspect of the present invention is a method for utilizing process identifiers to invalidate cached data. The method includes assigning a process identifier with a process on the cached device. The method also includes storing a plurality of data in a cache device as a plurality of cached data. The method also includes associating the process identifier with each of the plurality of cached data. The method also includes terminating the process on the cached device. The method also includes invalidating each of the plurality of cached data associated with the process identifier based on the termination of the process on the cached device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
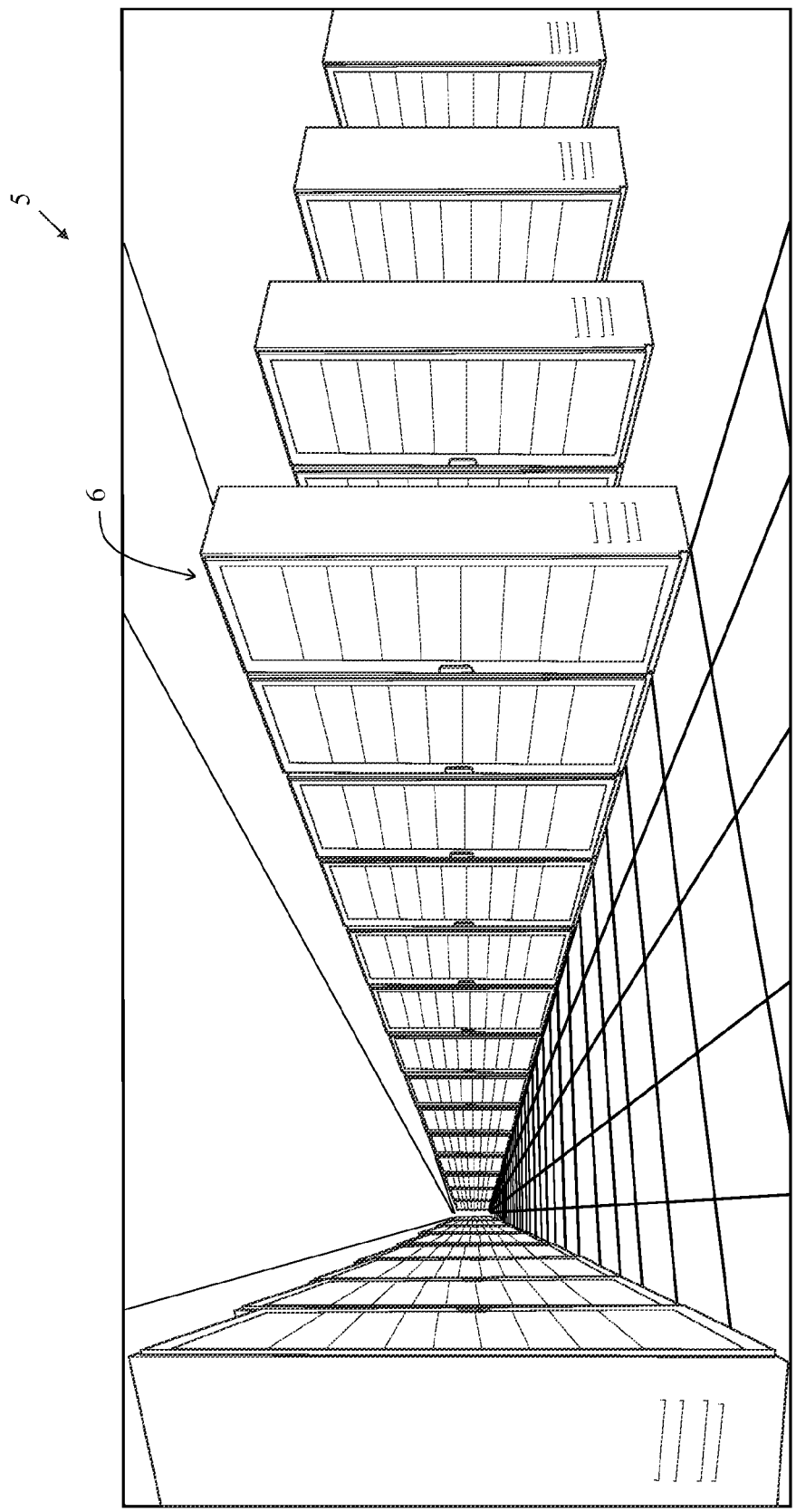
FIG. 1 illustrates the interior of a data center facility where a system of the present invention would reside.

Practically all execution environments (notable examples being Linux, the Microsoft Windows operating system, and the VMware ESXi hypervisor) assign identifiers to individual processes, including the "guest" processes of virtualized environments. These process identifiers (sometimes called Process IDs or PIDs, World Identifiers or WIDs) remain constant while a process is executing, however are subject to change when processes are migrated from one physical machine to another, or between invocations on the same physical machine. This property makes the process identifier of the process that loaded an item into a cache useful as a property of cache entry. Associating the process identifier responsible for loading a data item into the cache with the cache entry itself allows the implementation of a unified or shared cache servicing all processes or guests within a physical host, allowing each process or guest automatic access to as much cache resource as is appropriate without any administrative action or partitioning of the cache device. Furthermore, when a process or guest is moved to another machine or terminated an automated procedure can be implemented to invalidate and free cache resources associated with the process identifier that "owned" the cache entry. This prevents the accessing of "stale" data and allows for the timely reuse of cache resources that had been previously used by the defunct or moved process.

The preferred implementation involves including the process identifier in the generation of the key value that maps a logical address on the device being cached to a logical address on the caching device. By including the process identifier in the mapping key used to locate data within the caching device, all of the entries in the caching device can be effectively invalidated immediately once the process or guest that owns them is terminated or moved by declaring a "cache miss" for any such entries based on the process identifier. Ideally, the component of the lookup key should be able to be separated out, masked, or ignored such that it is possible to determine if any process is associated with a cache location. A process identifier may be reserved to indicate that an item in the cache contains valid data and is corresponding to a logical address on a device being cached but is not yet associated with an actual process identifier. If the process identifier is included in the lookup key value of the cache device, it is possible to instantaneously invalidate all cache entries associated with a process identifier by means of a simple test in the cache lookup function, whereas an asynchronous maintenance task can be responsible for the actual deletion and reclamation of the associated cache resources. This eliminates many potential race conditions in the invalidation and reclamation process.

The term process identifier as used in this disclosure is generic and can be any mechanism used to identify a particular process or guest, not necessarily a process ID as defined by an operating environment. The process identifier does not need to be used as part of the lookup key in a cache environment and may simply be associated in some manner with individual or groups of cache entries. If the process identifier is used as part of the lookup key, it is not necessary to be able to ignore the process identifier when looking up a data item in the cache device.

The present invention allows the use of a unified cache without the need for partitioning and pre-allocation of cache resources. By associating individual or groups of cache entries with the process or "guest" that created them, this method allows cache entries for a particular process to be invalidated and reclaimed without logically partitioning the cache device. This avoids the need to pre-allocate cache resources to individual processes or "guests", which can result in inefficient utilization of cache resources. Furthermore the administrative tasks involved in partitioning cache devices and assigning them to individual processes or guests can be burdensome in highly dynamic computing environments.

The present invention allows the implementation of a fully automated caching solution that supports the movement/migration of processes or "guests." By allowing the use of a unified cache and automatically associating cache entries with the process or "guest" that owns them, the operating environment can notify the caching system upon the movement or termination of a process or guest, facilitating the automated invalidation and reclamation of cache resources. Alternately a simple timeout mechanism can be used to detect when a process or guest is no longer active and the associated cache entries may be automatically invalidated and reclaimed.

The present invention allows for the optimal use of cache resources combined with quotas to provide guarantees of resource availability. Since there is no pre-allocation of cache resources needed and the cache may be unified, each process or guest may compete for and consume all cache resources. Quotas may optionally be implemented for guaranteed resource availability, however processes or "guests" are free to exceed their quotas if other processes or guests are not fully consuming their quotas.

The present invention preserves the ability to provide "per process or guest" statistics on resource utilization and performance. Whereas the cache may be implemented as a unified/shared cache, the association of process or guest identifier with each cache entry allows for separate statistics to be maintained for individual processes or guests. This may be useful for analyzing system performance, troubleshooting, or chargeback for resource utilization, as well as other uses.

The present invention allows the definition of an "unowned" process or "guest" identifier for use with valid data used to implement "pre-warming" or "pre-population" of cache data. A special process or guest identifier may be defined to indicate valid cache data that is not yet associated with a process or guest. Such an identifier may be useful for pre-populating ("pre-warming") the cache with data that is likely to be used in the near future but has not been accessed yet. Scenarios where this occurs are at system initialization time where historical data of previous cache contents can be used to pre-load data that had previously been in the cache and also when processes or guests are migrated between different physical machines. As part of the migration process the source machine could communicate a list of the data addresses previously associated with a process or "guest" to the target machine. The target machine could then preload these data locations in anticipation of the migrated process or "guest" accessing them.

Figure 2:
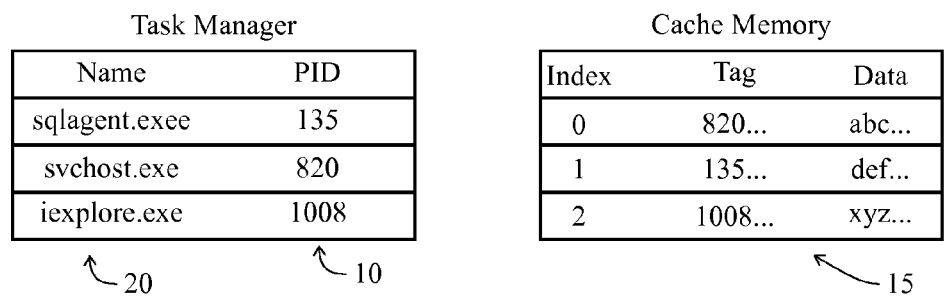
FIG. 2 is a block diagram of a task manager and a cache memory.
Figure 2A:
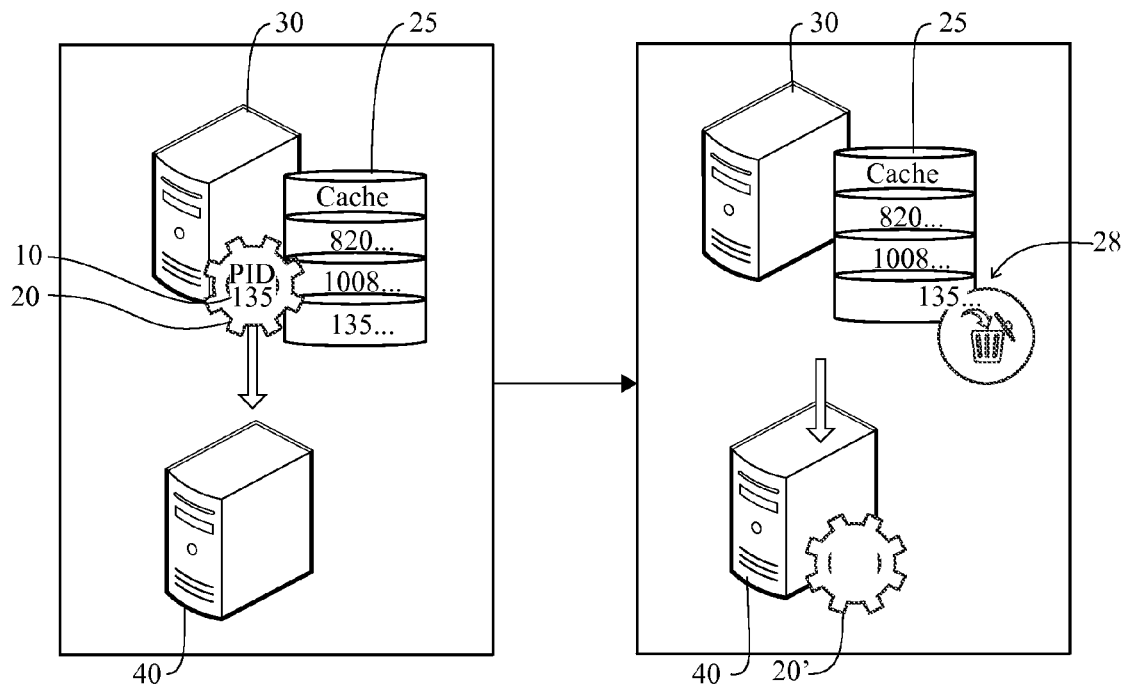
FIG. 2A is a block diagram of a process migration of the present invention.

Data center environments 5, as shown in FIG. 1, house rows and rows of server racks 6, which can fit an average of twenty rack mounted servers per cabinet. Computer processes are allowed to move from one machine to another for the purposes of load balancing, power conservation, or routine maintenance. This presents a problem for any data that is persistently stored within a physical machine, since the data may be modified on a different machine when a process has been migrated, rendering the original data to be invalid or "stale". Not only are there physical machines, but there are also virtual machines. Practically all execution environments (notable examples being Linux, the Microsoft Windows operating system, and the VMware ESXi hypervisor) assign identifiers to individual processes, including the "guest" processes of virtualized environments. These process identifiers (sometimes called Process IDs or PIDs, World Identifiers or WIDs) remain constant while a process is executing, however are subject to change when processes are migrated from one physical machine to another, or between invocations on the same physical machine. This property makes the process identifier of the process that loaded an item into a cache useful as a property of a cache entry. Associating the process identifier 10 responsible for loading a data item into the cache with the cache entry itself 15, as shown in FIG. 2 and FIG. 2A, allows the implementation of a unified or shared cache servicing all processes or guests within a physical host 30, allowing each process 20 or guest automatic access to as much cache 25 resource as is appropriate without any administrative action or partitioning of the cache device. Furthermore, when a process 20 or guest is moved to another machine 40 or terminated an automated procedure can be implemented to invalidate or delete 28 and free cache 25 resources associated with the process identifier 10 that "owned" the cache entry 15. This prevents the accessing of "stale" data and allows for the timely reuse of cache 25 resources that had been previously used by the defunct or moved process 20'.

Figure 3:
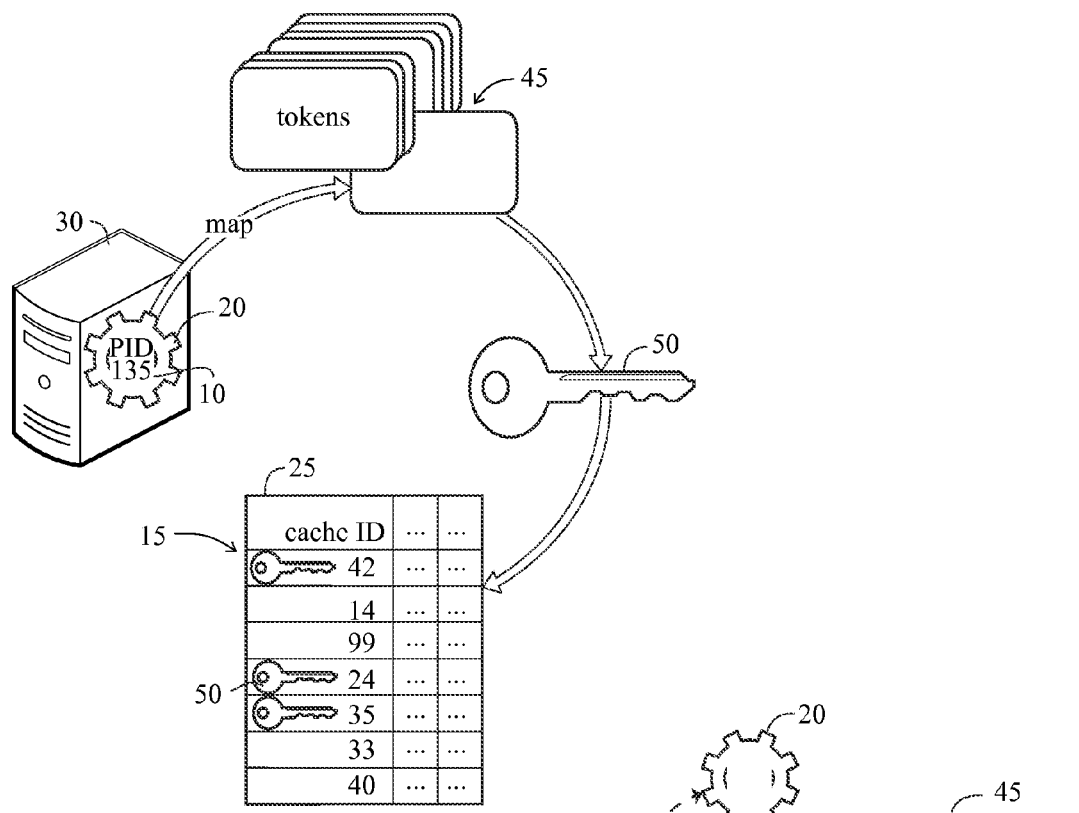
FIG. 3 is a block diagram for utilizing token to identify cached data.
Figure 3A:
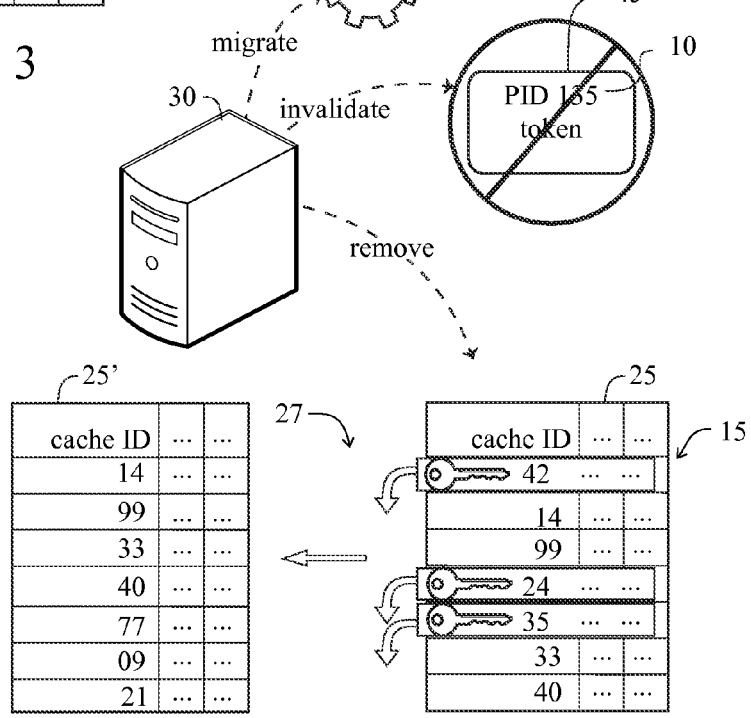
FIG. 3A is a block diagram for utilizing process identifiers to invalidate cached data.

The preferred implementation, as shown in FIG. 3 and FIG. 3A, involves including the process identifier 10 in the generation of the key 50 value that maps a logical address on the device 30 being cached to a logical address on the caching device. By including the process identifier 10 in the mapping key 50 used to locate data within the caching device, all of the entries 15 in the caching device can be effectively invalidated 27 immediately once the process 20 or guest that owns them is terminated or moved by declaring a "cache miss" for any such entries 15 based on the process identifier 10. Ideally, the component of the lookup key 50 should be able to be separated out, masked, or ignored such that it is possible to determine if any process 20 is associated with a cache location. A process identifier 10 may be reserved to indicate that an item in the cache 25 contains valid data and is corresponding to a logical address on a device 30 being cached but is not yet associated with an actual process identifier 10. If the process identifier 10 is included in the lookup key 50 value of the cache device, it is possible to instantaneously invalidate 27 all cache entries 15 associated with a process identifier 10 by means of a simple test in the cache lookup function, whereas an asynchronous maintenance task can be responsible for the actual deletion and reclamation of the associated cache resources 25'. This eliminates many potential race conditions in the invalidation and reclamation process.

The term process identifier as used in this disclosure is generic and can be any mechanism used to identify a particular process or guest, not necessarily a process ID as defined by an operating environment. The process identifier does not need to be used as part of the lookup key in a cache environment and may simply be associated in some manner with individual or groups of cache entries. If the process identifier is used as part of the lookup key, it is not necessary to be able to ignore the process identifier when looking up a data item in the cache device.

Figure 4:
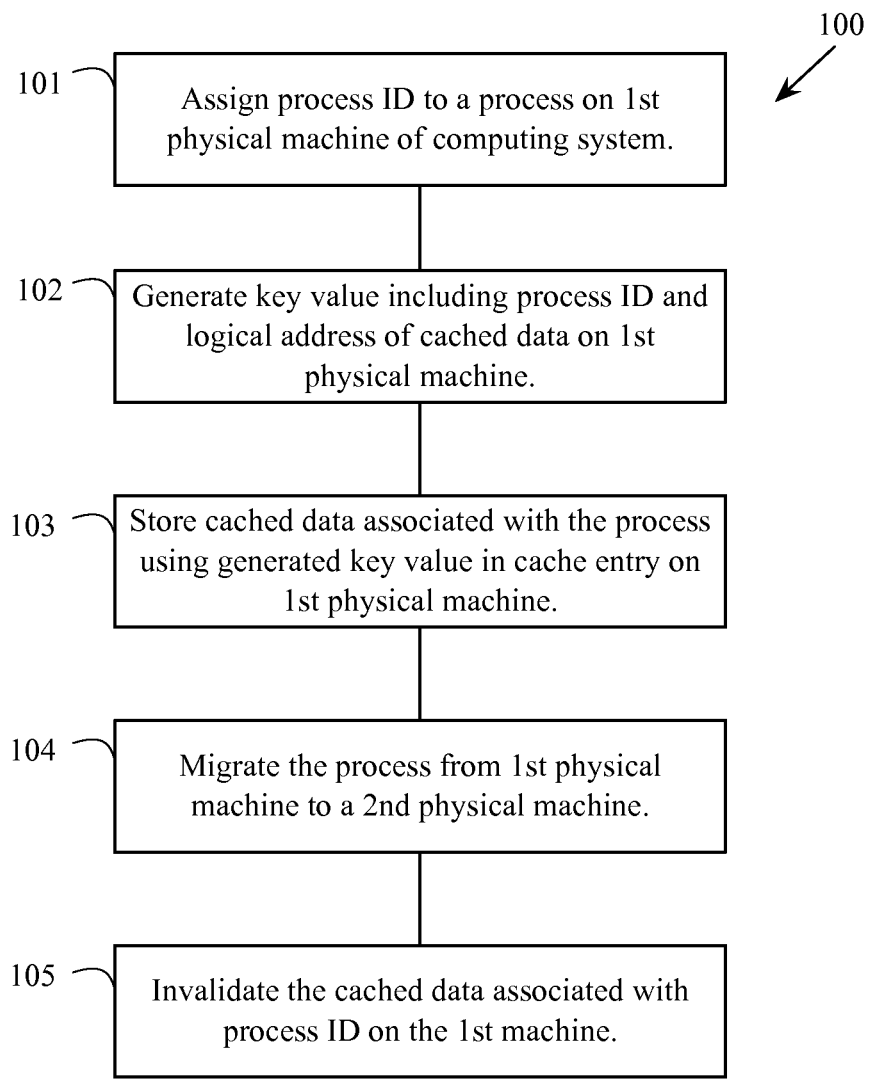
FIG. 4 for a method for utilizing process identifiers to invalidate cached data.

FIG. 4 shows a method 100 of the preferred implementation of the present invention in a flow chart. In step 101, The process ID is assigned to a process on the source machine of a system. A key is created in step 102, which includes the process identifier and the logical address of the cached data. Data is cached using the generated key associated with the process as part of the cache entry on the source machine in step 103. In step 104, the process is migrated from the source machine to a destination machine and then, in step 105, the cache on the source machine is invalidated based on the key in the cache entry that was associated with the migrated process.

Figure 5:
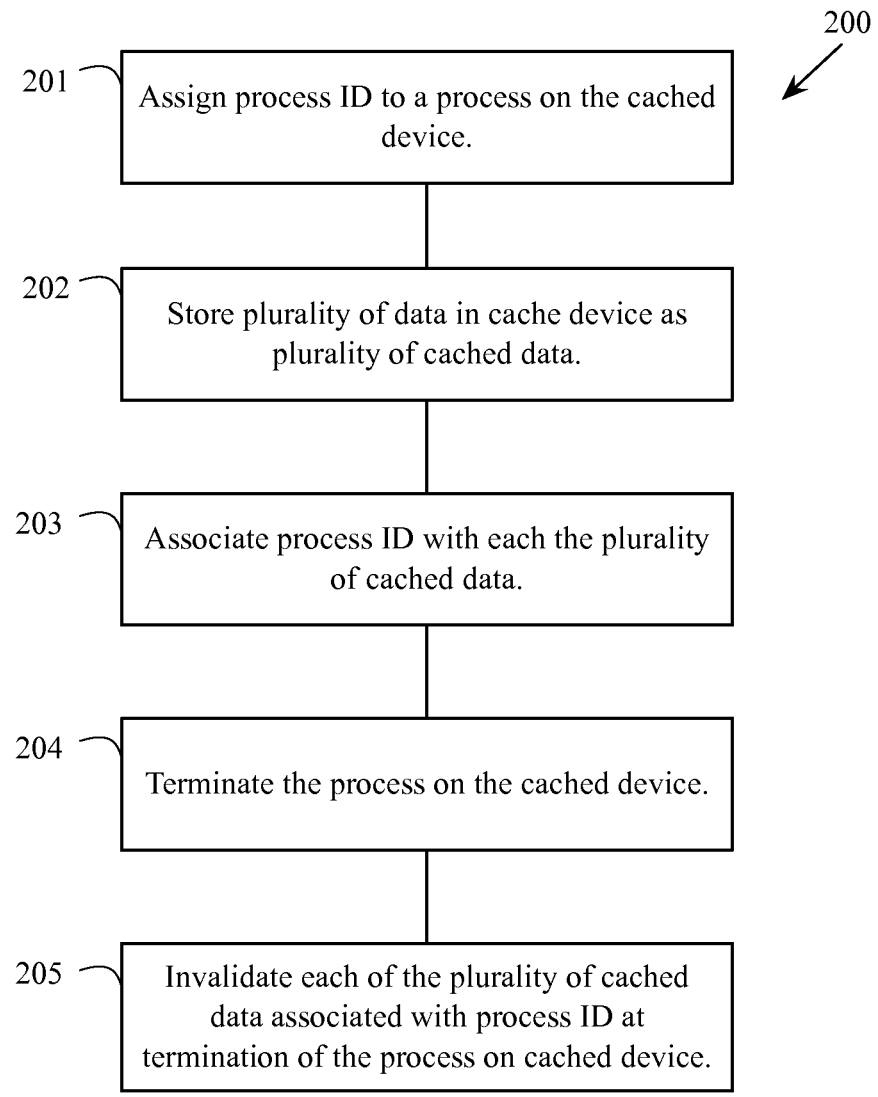
FIG. 5 for a method for utilizing process identifiers to invalidate cached data.

FIG. 5 shows another embodiment, method 200, of the present invention. At step 201, the process ID is assigned to a process on the cached device. Data is stored as cached data in step 202. The process ID is associated with the pertaining cached data in step 203. In step 204, the process is terminated on the cached device and then at step 205 the cached data associated with the process ID is invalidated when the process is terminated.

Figure 6:
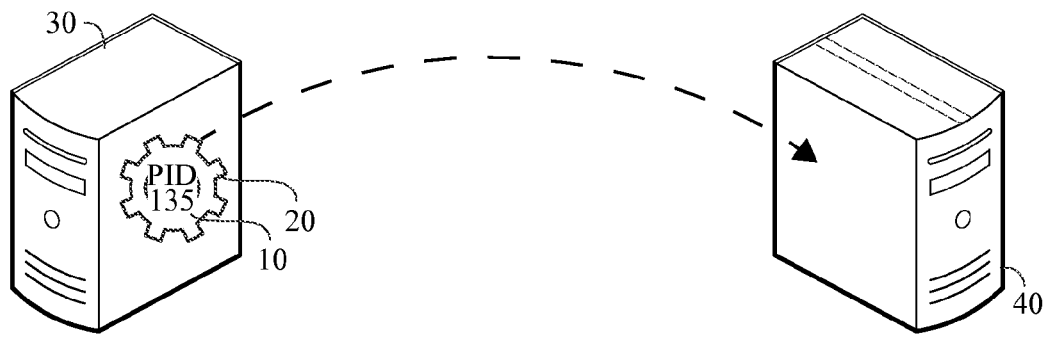
FIGS. 6, 6A and 6B are block diagrams of the method for utilizing process identifiers to invalidate cached data.
Figure 6A:
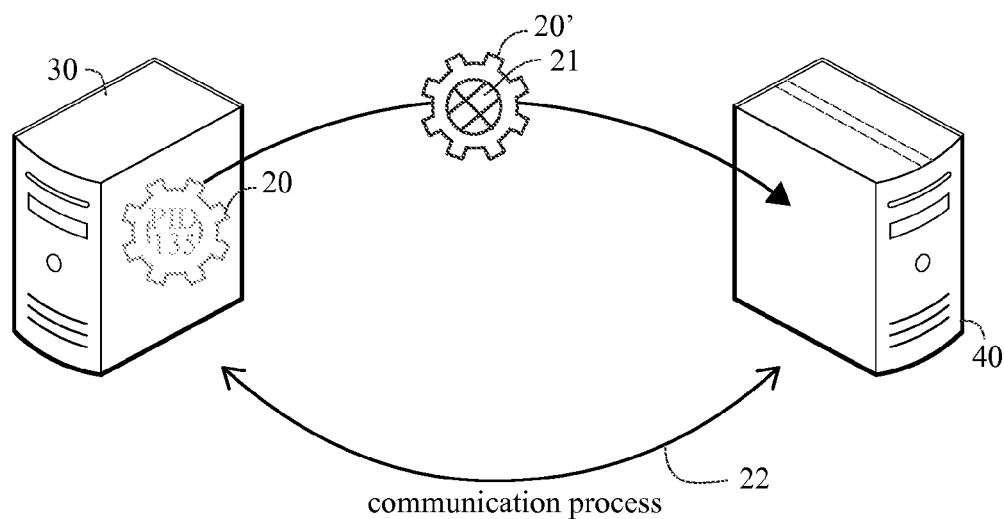
Figure 6B:
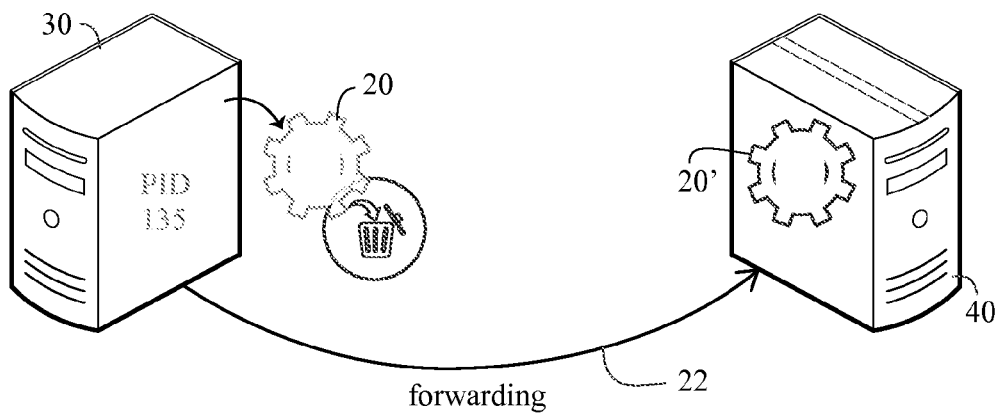

The general steps of process migration is shown in FIGS. 6-6B. In FIG. 6 shows the destination machine 40 and the source machine 30 with the process 20 and the process' ID 10. FIG. 6A shows that the process' 20 execution state is suspended at the source machine 30 and the extracted process 20' includes process state 21 information, such as memory, stack, register contents, communication state, kernel context. The local process ID 10 cannot migrate with the process 20', as the process ID is relevant only to the local machine. Communication 22 for the process 20' is redirected also. FIG. 6B shows the process 20' at the destination machine 40 and the original process 20 is cleaned up at the source machine 30. Communication 22 is completely forwarded to the new process 20' at the destination machine 40.

Figure 7:
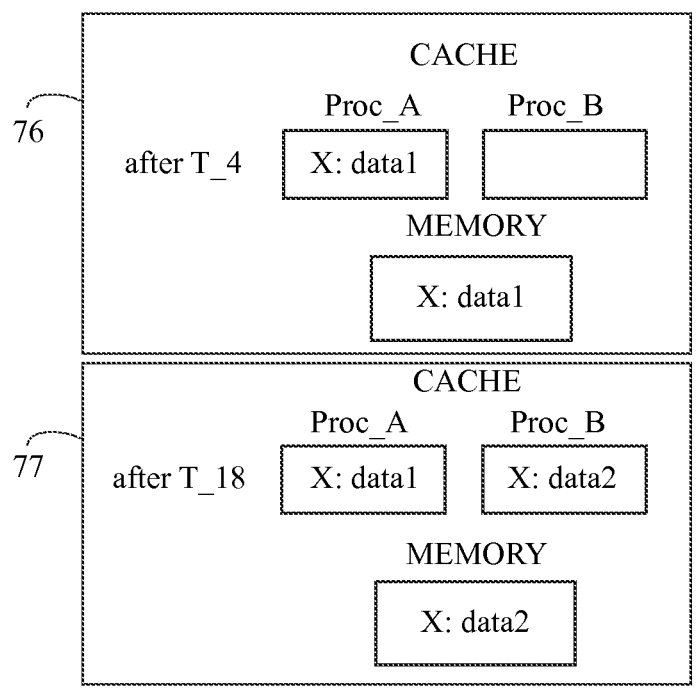
FIG. 7 is a bock diagram of prior art caching of a migrated process of a general method of prior art.

FIG. 7 is a diagram showing prior art cache inconsistency after a process migrates. Time 73 is shown as incremental time. A process on a source machine Processor A 71 reads DataX with a value data1 at Time (1), and caches DataX with value data1. After Time (4) 76 the cache and the memory have the same values for DataX. The process is then migrated from the source machine Processor A 71 to a destination machine Processor B 72 and modifies DataX to data2 and caches the value data2 for DataX. The two caches, on the source machine Processor A 71 and the destination machine Processor B 72, are then different after Time (18) 77, leaving Processor A 71 with stale data.

Figure 8:
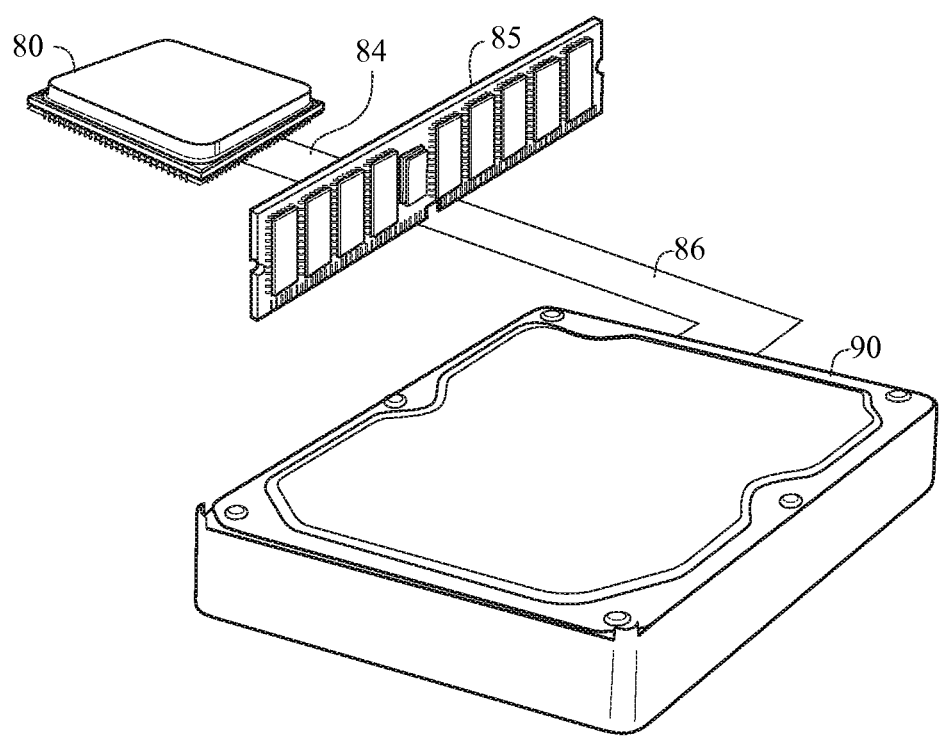
FIG. 8 is a block diagram of the components of the general method for utilizing process identifiers to invalidate cached data.

Memory hierarchy has a big impact on system performance. Memory includes system memory, such as cache, local secondary storage, such as local hard drive, and remote secondary storage, such as tape libraries or distributed file systems. The higher up in the hierarchy, the closer the memory resides in relation to the processor, thereby, the quicker the processor can access the data within the memory. FIG. 8 shows the very top levels of the hierarchy, the register and L1 caches 80, which are embedded on the processor, connecting to main memory 85 by a memory bus 84, and the hard disk drive 90 connected by the I/O bus 86.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A system for utilizing process identifiers to invalidate cached persistent data, the system comprising:
    a first physical machine comprising a unified cache device and at least one process, wherein the unified cache device services all processes within the first physical computer, and the unified cache device stores cached persistent data for the at least one process;
    a second physical machine in communication with the first physical machine;
    wherein the first physical machine is configured to assign a process identifier to the at least one process;
    wherein the first physical machine is configured to generate a key value that comprises the process identifier and maps a logical address on the first physical machine of the cached persistent data for the at least one process;
    wherein the first physical machine is configured to store cached persistent data associated with the at least one process using the generated key value in a cache entry on the first physical machine;
    wherein the at least one process is migrated from the first physical machine to a second physical machine; and wherein the first physical machine is configured to invalidate the cached persistent data associated with the process identifier based on the migration of the at least one process from the first physical machine, and the invalidated cached persistent data remains stored on the first physical machine while the at least one process has migrated from the first physical machine to the second physical machine, wherein the cached persistent data was pre-populated on the first physical machine and assigned a guest identifier before the at least one process was on the first physical machine, and wherein the first physical machine being configured to assign the process identifier to the at least one process comprises changing the guest identifier assigned to the cached persistent data to the process identifier assigned to the at least one process.

2. The system according to claim 1, wherein the process identifier is included in a mapping key utilized to locate the cached persistent data within the first physical machine.

3. The system according to claim 1, wherein the process identifier is a mechanism utilized to identify a particular process.

4. A method for utilizing process identifiers to invalidate cached persistent data in a computer system, the method comprising:

assigning a process identifier to a process on a source physical machine in the computer system;

storing persistent data for the process in a unified cache device as the cached persistent data on the source physical machine, wherein the unified cache device services all processes within the first physical computer;

associating the process identifier with the cached persistent data;

terminating the process on the source physical machine; and invalidating the cached persistent data associated with the process identifier based on the termination of the process on the source physical machine, the invalidated cached persistent data remaining stored on the source physical computer after the process has terminated, wherein the cached persistent data was pre-populated on the source physical machine and assigned a guest identifier before the process was on the source physical machine, and wherein associating the process identifier with the cached persistent data comprises changing the guest identifier assigned to the cached persistent data to the process identifier assigned to the process.

5. The method according to claim 4, wherein the process identifier is included in a mapping key utilized to locate the cached persistent data within the source physical machine.

6. The method according to claim 4, wherein the process identifier is a mechanism utilized to identify a particular process.

7. The method according to claim 4, wherein terminating the process comprises migrating the process from the source physical machine to a destination physical machine.

8. A method for utilizing process identifiers to invalidate cached persistent data, the method comprising:

assigning a process identifier to a process on a first physical machine of a computing system;

generating a key value that includes the process identifier and maps a logical address on the first physical machine of the cached persistent data;

storing the cached persistent data associated with the process using the generated key value in the cache entry on the first physical machine;

migrating the process from the first physical machine of the computing system to a second physical machine of the computing system; and invalidating the cached data associated with the process identifier based on the migration of the process, the invalidated cached persistent data remaining stored on the first physical machine after the process has migrated, wherein the cached persistent data was pre-populated on the first physical machine and assigned a guest identifier before the at least one process was on the first physical machine, and wherein generating the key value that includes the process identifier and mapping the logical address on the first physical machine of the cached persistent data comprises changing the guest identifier assigned to the cached persistent data to the process identifier assigned to the process.

9. The method according to claim 8, wherein the process identifier is included in a mapping key utilized to locate the cached persistent data within the first physical machine.

10. The method according to claim 8, wherein the process identifier is a mechanism utilized to identify a particular process.

* * * * *